United States Patent
Kataria et al.

(10) Patent No.: US 10,832,131 B2
(45) Date of Patent: Nov. 10, 2020

(54) SEMANTIC SIMILARITY FOR MACHINE LEARNED JOB POSTING RESULT RANKING MODEL

(71) Applicant: Microsoft Technology Licensing, LLC, Redmond, WA (US)

(72) Inventors: Saurabh Kataria, Newark, CA (US); Dhruv Arya, Sunnyvale, CA (US); Ganesh Venkataraman, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 652 days.

(21) Appl. No.: 15/658,704

(22) Filed: Jul. 25, 2017

(65) Prior Publication Data
US 2019/0034792 A1    Jan. 31, 2019

(51) Int. Cl.
*G06N 3/08* (2006.01)
*G06Q 10/10* (2012.01)
*G06F 16/951* (2019.01)
*G06N 3/04* (2006.01)

(52) U.S. Cl.
CPC .............. *G06N 3/08* (2013.01); *G06F 16/951* (2019.01); *G06N 3/0427* (2013.01); *G06N 3/0454* (2013.01); *G06N 3/0481* (2013.01); *G06N 3/084* (2013.01); *G06Q 10/1053* (2013.01)

(58) Field of Classification Search
CPC .............................. G06N 3/0454; G06F 40/30
USPC ..................................................... 706/15, 45
See application file for complete search history.

(56) References Cited

U.S. PATENT DOCUMENTS

| | | | |
|---|---|---|---|
| 6,728,695 B1* | 4/2004 | Pathria | G06F 16/313 |
| 8,914,383 B1* | 12/2014 | Weinstein | G06Q 10/063112 707/749 |
| 2004/0030566 A1* | 2/2004 | Brooks Rix | G06Q 10/1053 705/321 |
| 2015/0074027 A1* | 3/2015 | Huang | G06F 40/40 706/25 |
| 2016/0162779 A1* | 6/2016 | Marcus | G06N 20/00 706/12 |
| 2018/0285824 A1* | 10/2018 | Kenthapadi | G06Q 50/01 |
| 2019/0034793 A1 | 1/2019 | Kataria et al. | |

FOREIGN PATENT DOCUMENTS

WO    2019023358 A1    1/2019

OTHER PUBLICATIONS

"International Search Report and Written Opinion Issued in PCT Application No. PCT/US2018/043718", dated Oct. 15, 2018, 14 Pages.
"Notice of Allowance Issued in U.S. Appl. No. 15/658,712", dated May 12, 2020, 11 Pages.
"International Preliminary Report on Patentability Issued in PCT Application No. PCT/US2018/043718", dated Feb. 6, 2020, 8 Pages.

* cited by examiner

*Primary Examiner* — David R Vincent
(74) *Attorney, Agent, or Firm* — Schwegman Lundberg & Woessner, P.A.

(57) ABSTRACT

In an example embodiment, a machine learning algorithm is used to train a deep semantic similarity neural network to output a semantic similarity score between a candidate job search query and a candidate job search result. This semantic similarity score can then be used in a ranking phase to rank job search results in response to a first job search query.

17 Claims, 11 Drawing Sheets

SEMANTIC SIMILARITY FOR MACHINE LEARNED JOB POSTING RESULT RANKING MODEL

TECHNICAL FIELD

The present disclosure generally relates to technical problems encountered in performing job searches on computer networks. More specifically, the present disclosure related to the use of semantic similarity in a machine learned job posting result ranking model to solve technical problems such as cross-language retrieval and ranking and retrieval degradation due to query preprocessing errors.

BACKGROUND

The rise of the Internet has occasioned two disparate phenomena: the increase in the presence of social networks, with their corresponding member profiles visible to large numbers of people, and the increase in the use of these social networks to perform searches for jobs that have been posted on or linked to by the social networks.

Various pre-preprocessing steps commonly performed on job search queries in social networking services rely heavily on low-level natural language processing such as tokenization, normalization, etc., which are relatively mature for popular languages such as English, French, Spanish, etc. However, for retrieval and ranking in other languages, as well as cross-language retrieval (i.e., retrieval across multiple languages with one search), erroneous low-level natural language processing operations prohibit query expansions and rewriting, retrieval, and ranking processes fall back to basic keyword-based similarity measures. What is needed is a way to obviate the need for advanced low-level natural language processing operations, to improve cross-language retrieval.

Additionally, the tokenization and tagging performed by a query tagger and rewriter can be error prone, which propagates the errors to jobs retrieval and ranking phases. For example, consider the queries "software engineering manager" and "manager software engineering." The former query is tagged as a title on the whole query, while the latter has "manager" tagged as a title and "software engineering" tagged as a skill. The impact of difference in tagging is a difference in query construction, with the former query retrieving with an emphasis on title only and the latter query including jobs that match both the skill and the title. Moreover, this difference in tagging propagates to a ranking phase, where tags for titles and skills contribute differently to the ranking algorithm. What is needed is a way to reduce or eliminate this retrieval degradation due to query preprocessing errors.

Furthermore, current job search mechanisms expand "important" tokens in queries with their synonyms using a pre-defined list of similar keywords. This manual step, however, is not scalable to different domains and locales. What is needed is a way to represent the query in a way that obviates the need for this step.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a deep machine learning architecture is used to rank semantically similar job postings in response to a query. Specifically, a training system is provided that can learn embeddings of queries and job postings into a semantic space where similarity can be defined mathematically. A ranking system can then use the trained embeddings in its ranking phase. Additionally, a method of combining rankings of retrieved jobs from queries from term-based and semantic-based retrieval engines is provided.

The result is that low recall queries can be handled, where the number of documents scored in a retrieval phase is limited because of either limited (e.g., only keyword-based) query understanding, or because of a lack of a semantic model of document retrieval. Additionally, ranking in job searches with semantic features learned from clickthough job search data can be improved.

Figure 1:
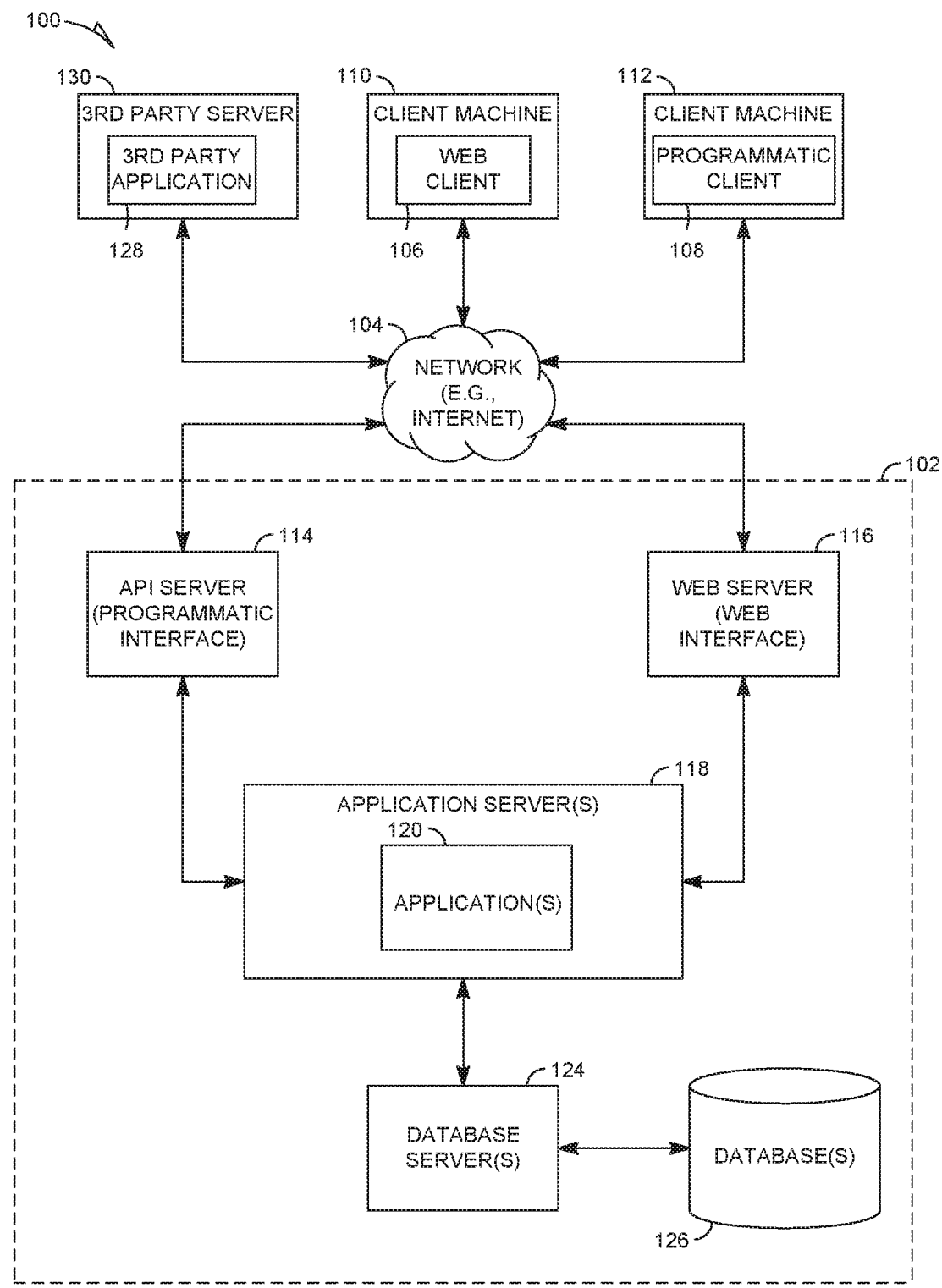
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
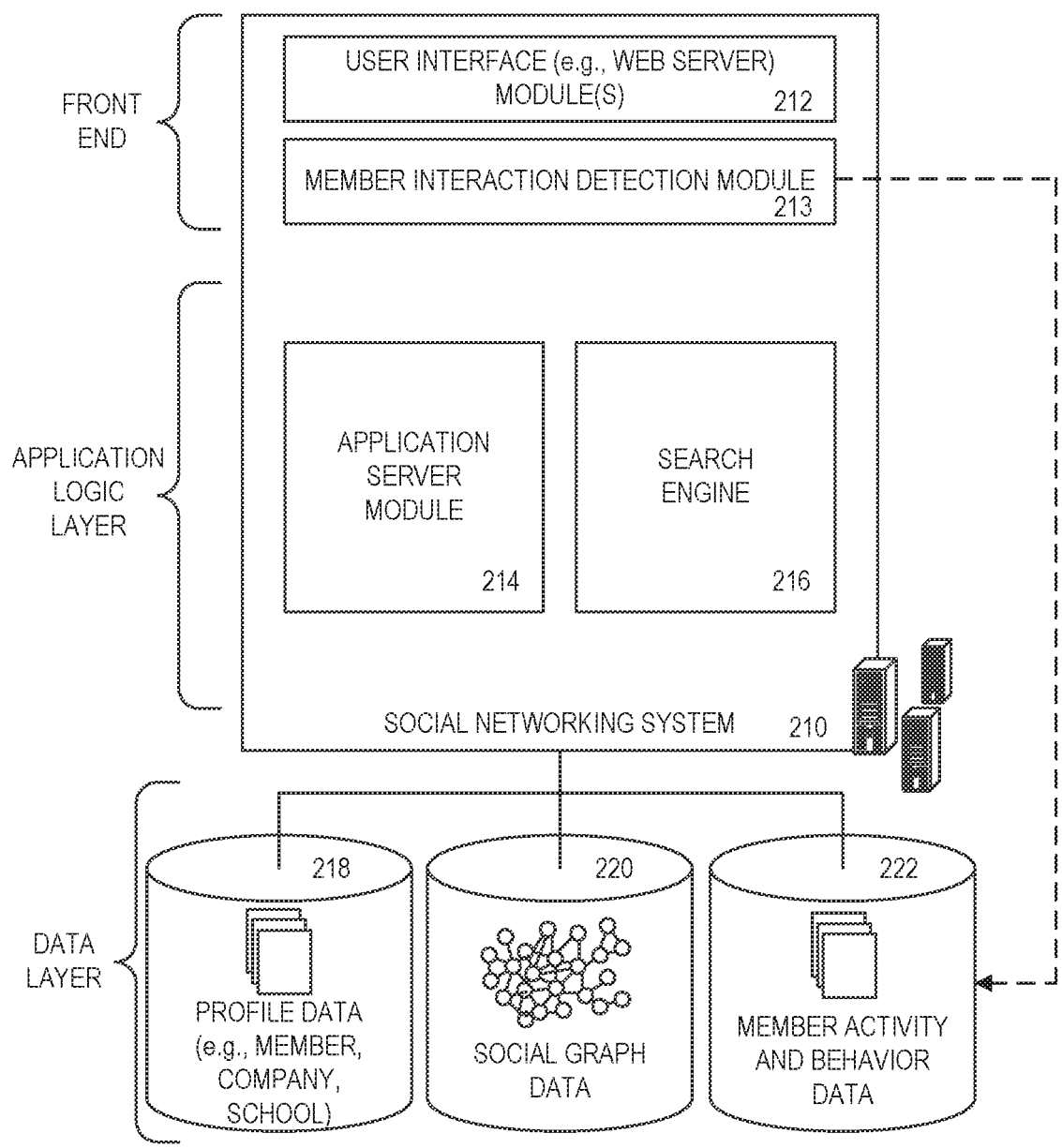
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow"

another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service. Nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
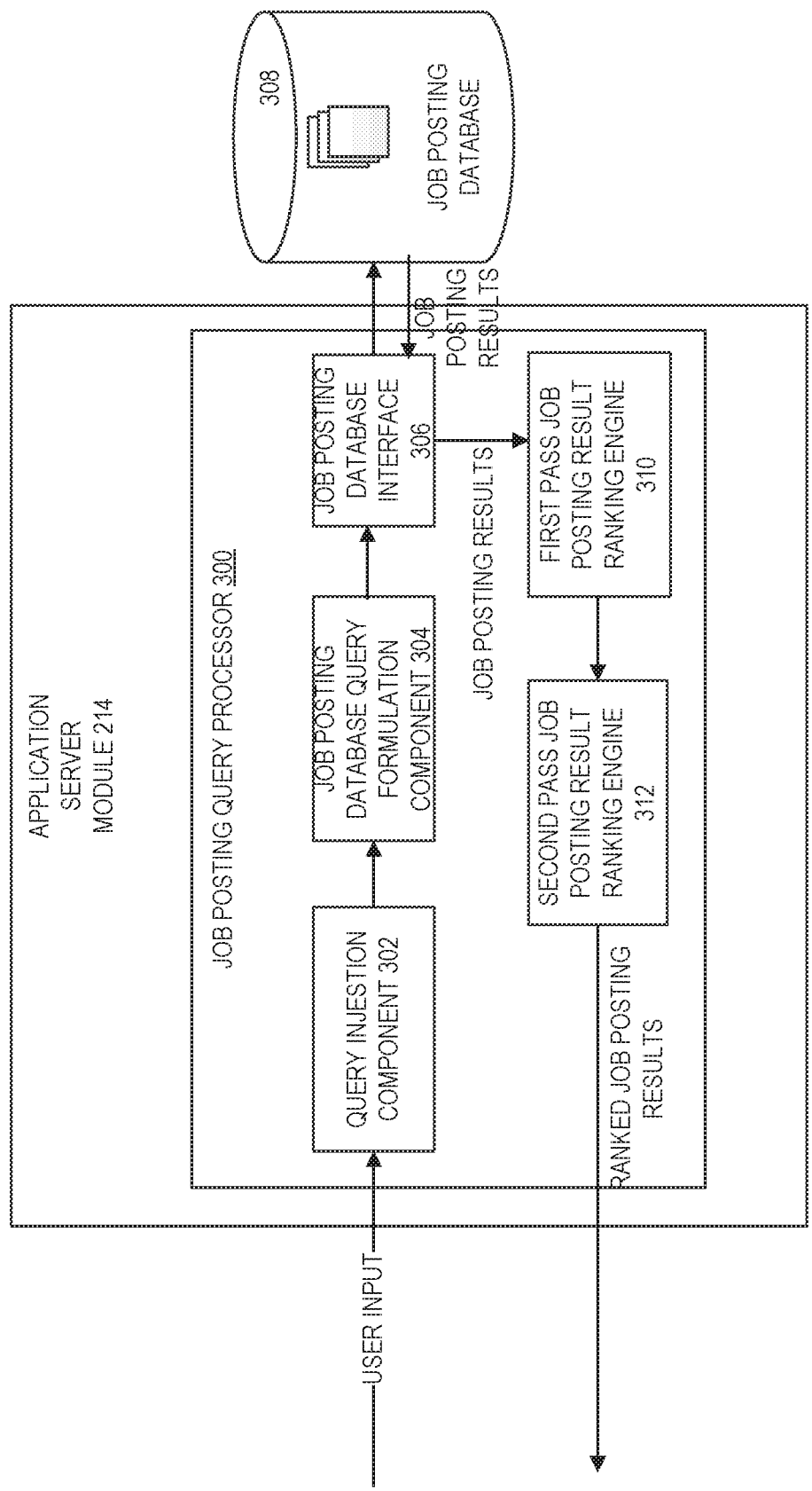
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system, in FIG. 3 only those components that are relevant to the present disclosure are depicted. The application server module 214 includes a job posting query processor 300. The job posting query processor 300 comprises a query ingestion component 302, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other members or entities, etc.

This "query" may be sent to a job posting database query formulation component 304, which formulates an actual job posting database query, which will be sent via a job posting database interface 306 to job posting database 308. Job posting results responsive to this job posting database query are sent to the first pass job posting result ranking engine 310, again via the job posting database interface 306. The first pass job posting result ranking engine 310 then performs a first pass at ranking the job posting results. A second pass job posting result ranking engine 312 performs a second pass at ranking the job posting results and then sends the ranked job posting results back to the user interface for display to the user.

Traditionally the job posting database query formulation component 304, first pass job posting result ranking engine 310, and second pass job posting result ranking engine 312 all utilized keyword-based algorithms that did not factor in semantic similarity. In an example embodiment, one or more of these components are modified to factor in semantic similarity.

Figure 4:
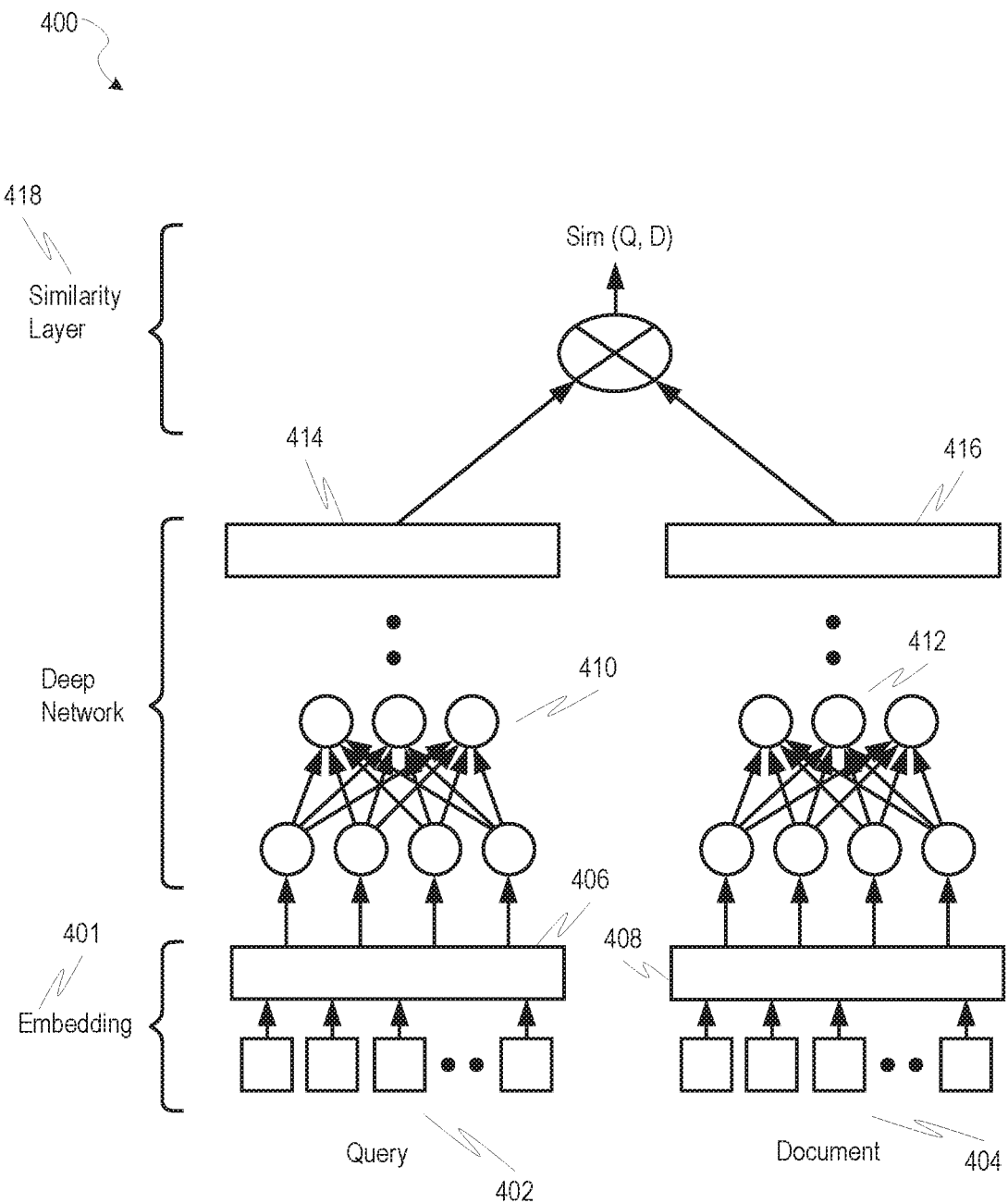
FIG. 4 is a block diagram illustrating a network structure for Deep Semantic Similarity Measures (DSSM), in accordance with an example embodiment.

In an example embodiment, a Siamese network-based deep machine learning model is utilized. Here, a machine learning algorithm trains a pair of machine learning models, one for queries (utilized, for example, in the job posting database query formulation component 304) and one for search results (utilized, for example, in the first pass job posting result ranking engine 310 and second pass job posting result ranking engine 312). Parameters are shared between the models. In an example embodiment, this Siamese network-based machine learning algorithm utilizes Deep Semantic Similarity Measures (DSSM). It acts to train a deep network model using clickthrough data (e.g., the number of times members selected the job posting results or, alternatively, the number of times members applied for jobs corresponding to the job posting results), with cosine similarity on top layer embeddings. FIG. 4 is a block diagram illustrating a network structure 400 for DSSM, in accordance with an example embodiment. Here, an embedding layer 401 acts to embed queries 402 and documents 404 (job posting results) into corresponding high dimensionality vectors 406, 408, respectively, containing one or more features. The high dimensionality vectors 406, 408 are then fed as input to a query-based DSSM model 410 and document-based DSSM model 412, respectively, which each act to output concept vectors 414, 416, respectively, in a low-dimensional semantic feature space. A similarity layer 418 may then determine similarity of the concept vectors 414, 416 using, for example, cosine similarity.

In a convolutional variant of the above technique, a convolution is trained on the sequence of words in both the query and the document.

While the Siamese network-based deep machine-learning model works well for single types of inputs (features), such as company, locations, etc., it may fail to capture interactions between query and document input features. In an example embodiment, an interaction network-based deep machine-learning model is utilized. The interaction network-based deep machine-learning model captures feature interactions while constructing the deep networks. This can be extended with residual training that can train deeper layers with a residual-based objective function. The interaction among features can be captured at different layers.

Figure 5:
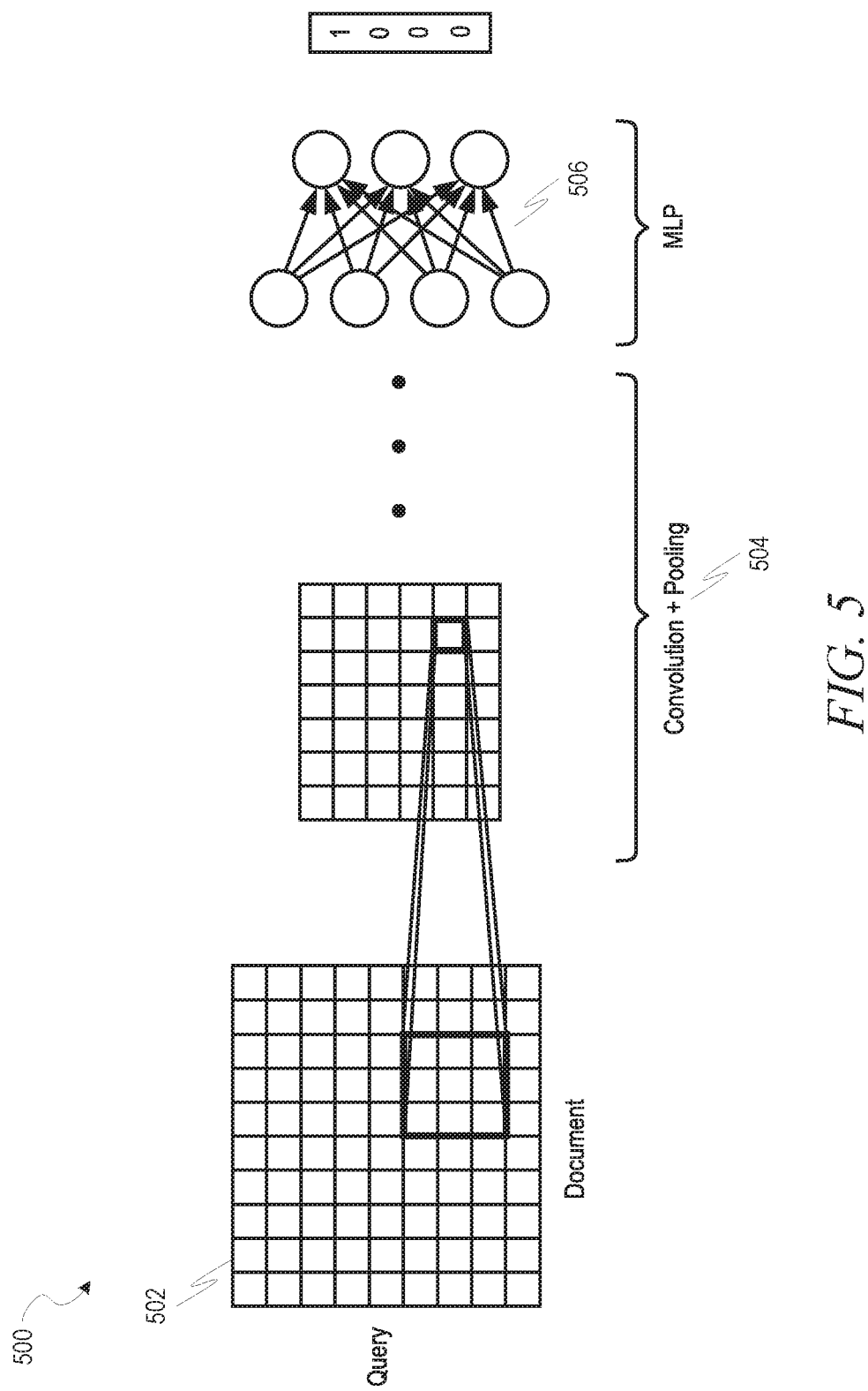
FIG. 5 is a block diagram illustrating a convolution matching model for click through data, in accordance with an example embodiment.

FIG. 5 is a block diagram illustrating a convolution matching model 500 for click through data, in accordance with an example embodiment. The model 500 includes a matrix 502 formed from the combinations of queries 402 and documents 404. This matrix 502 is fed through convolution and pooling layers 504 to a multilayer perceptron (MLP) 506. The MLP 506 is a feedforward artificial neural network model that maps sets of input data onto a set of appropriate outputs. The MLP 506 comprises multiple layers of nodes in a directed graph, with each layer fully connected to the next one. Except for the input nodes, each node is a neuron (processing element) with a nonlinear activation function. A supervised machine learning technique such as backpropagation may be used to train the MLP 506.

Figure 6:
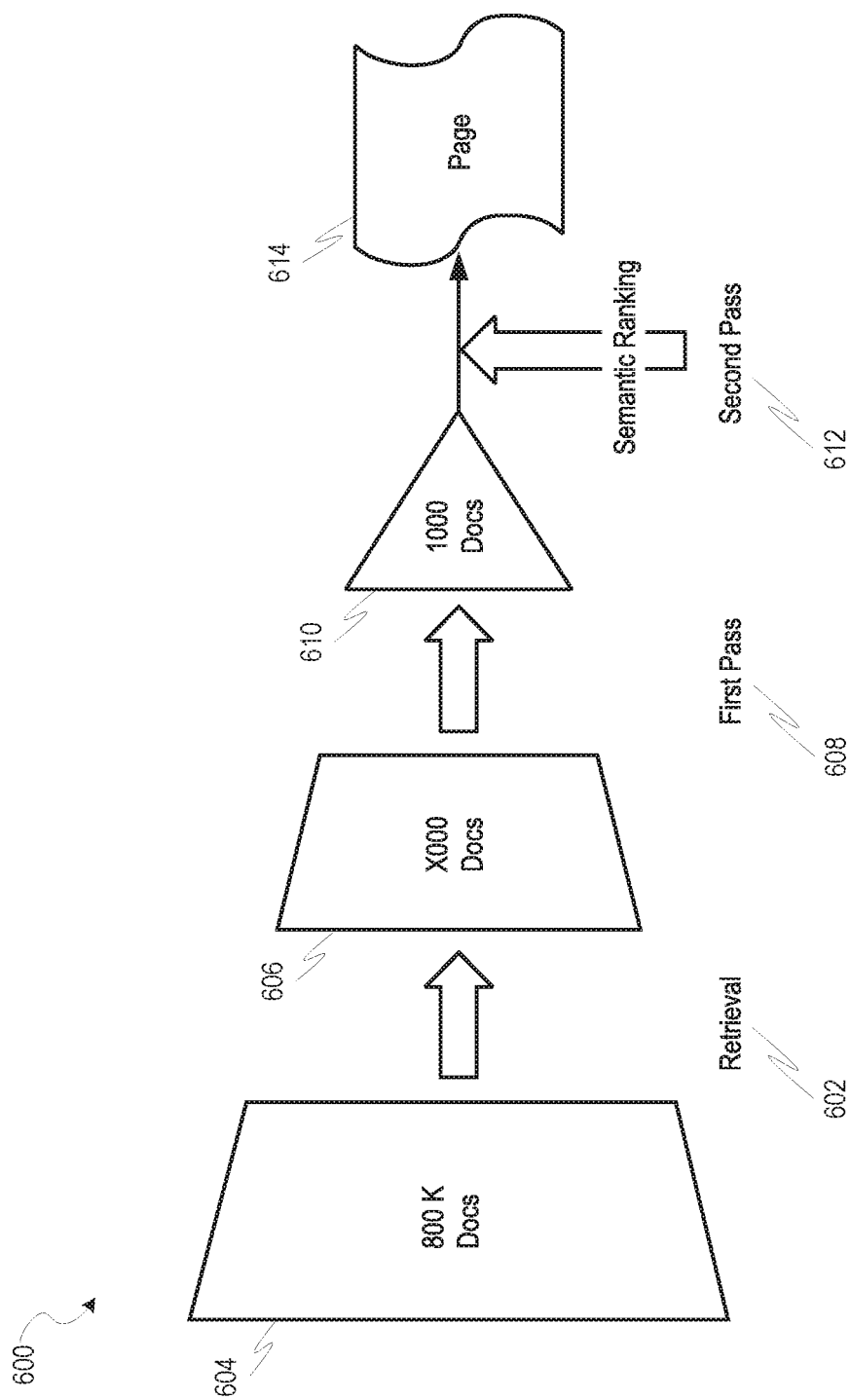
FIG. 6 is a diagram illustrating a training pipeline for training a machine-learning model used for ranking documents, in accordance with an example embodiment.

In an example embodiment, the ranking phases (e.g., performed by the first pass job posting result ranking engine 310 and/or second pass job posting result ranking engine 312 of FIG. 3) make use of DSSM dictionaries and adds features based on a trigram hash of both query and job features, such as titles and descriptions. FIG. 6 is a diagram illustrating a training pipeline 600 for training a machine learning model used for ranking documents 404 in accordance with an example embodiment. Here, the training pipeline 600 is three stages. In a retrieval stage 602, a job posting corpus 604 is searched to obtain a first job posting result set 606. Then, a first pass ranking stage 608 ranks the first job posting result set 606, producing ranked job posting results 610. In a second pass ranking stage 612, semantic ranking is used as a feature in the ranking algorithm, producing a results page 614.

Figure 7:
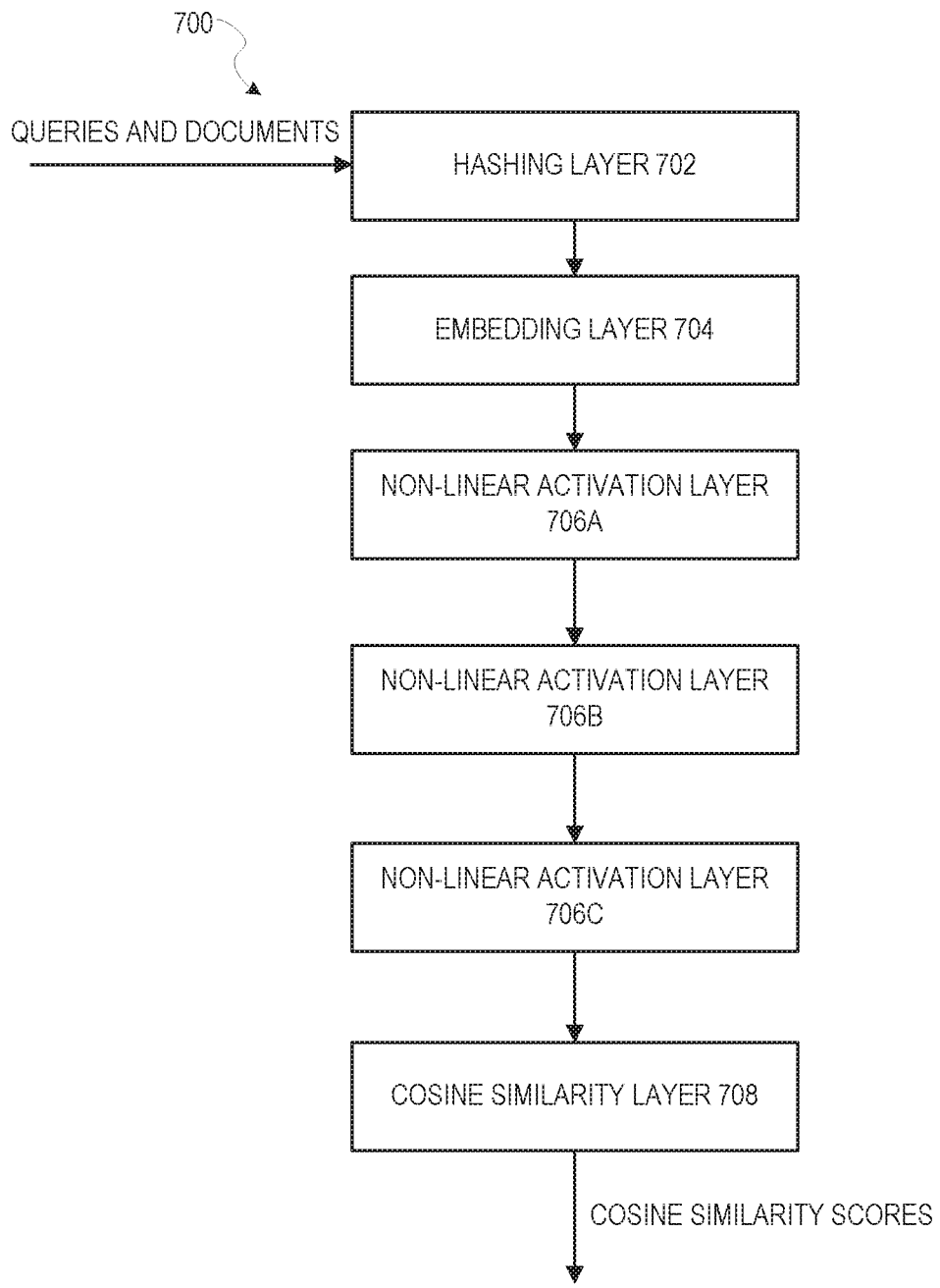
FIG. 7 is a block diagram illustrating a deep neural network used to learn semantic ranking in accordance with an example embodiment.

In an example embodiment, the semantic representation used in the semantic ranking is learned using a deep neural network. FIG. 7 is a block diagram illustrating a deep neural network 700 used to learn semantic ranking, in accordance with an example embodiment. A hashing layer 702 hashes the incoming text of a query or job title. Specifically, the incoming text may be converted into multiple n-letter tokens. For example, if n is 3, then the query abc gets converted into #ab, abc, bc#, where # is the boundary token. Hashing provides the technical benefits of dimensionality reduction and out of vocabulary word representations.

An embedding layer 704 takes the previously hashed tokens and represents them in a vector space. In an example embodiment, this vector space has 300 dimensions. Non-linear activation layers 706A-706C comprise the learning layers of the deep neural network 700. They may take, for example, tan h as the activation unit. Finally, a cosine similarity layer 708 takes the representations from the query and job title and computes cosine similarity among these representations. The cosine similarity score may then be used as the feature in the second pass ranking stage 612.

In an example embodiment, the non-linear activation layers 706A-706C work as follows. If x is denoted as the input term vector, y as the output vector, $l_i$, i=1, ..., N−1, as the intermediate hidden layers, $W_i$ as the i-th weight matrix, and $b_i$ as the i-th bias term, then:

$$l_1 = W_1 x$$

$$l_i = f(W_i l_{i-1} + b_i), i=2, \ldots, N-1$$

$$y = f(W_N l_{N-1} + b_N)$$

where tan h is used as the activation function at the output layer and the hidden layers $l_i$, i=2, ..., N−1:

$$f(x) = \frac{1 - e^{-2x}}{1 + e^{-2x}}$$

The semantic similarity score between a query Q and a document D is then measured as $$R(Q, D) = \mathrm{cosine}(y_Q, y_D) = \frac{y_Q^T y_D}{\|y_Q\| \|y_D\|}$$

where $y_Q$ and $y_D$ are the concept vectors 414, 416 of the query and document, respectively.

Figure 8:
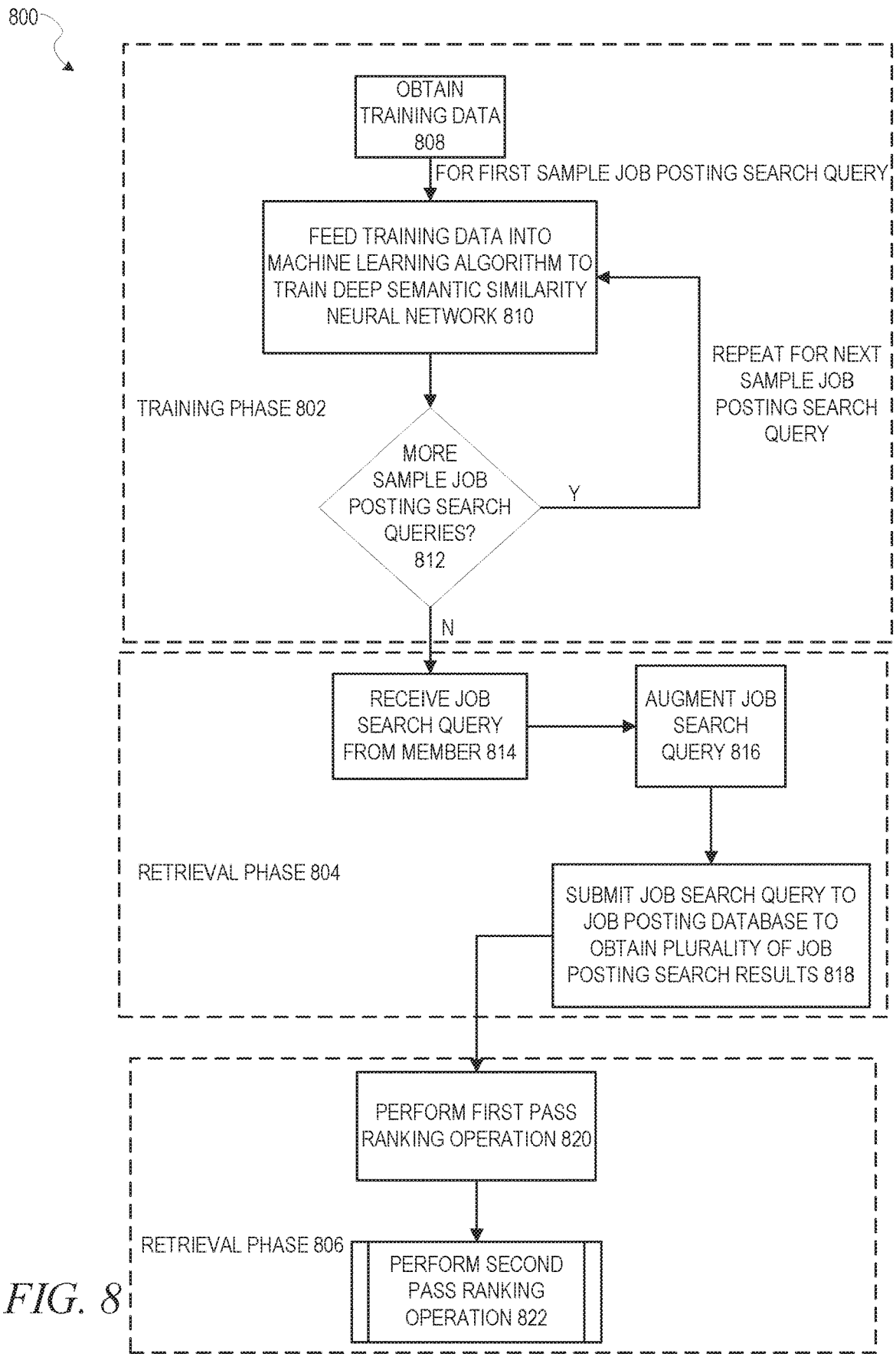
FIG. 8 is a flow diagram illustrating a method to sort candidate job posting results produced by queries in a social networking service, in accordance with an example embodiment.

FIG. 8 is a flow diagram illustrating a method 800 to sort candidate job posting results produced by queries in a social networking service, in accordance with an example embodiment. This method 800 may be divided into a training phase 802, a retrieval phase 804, and a ranking phase 806. In the training phase 802, at operation 808, training data pertaining to sample job posting search queries and member data corresponding to the job posting search queries is obtained. The training data may comprise sample job posting search results and indications as to which of the sample job posting search results were selected by members performing corresponding job posting search queries. The member data includes information about members who performed the corresponding searches, such as member profile information and usage history. A loop is then begun for each of the sample job posting search queries. At operation 810, the training data corresponding to the job posting search query, along with the corresponding member data, is fed into a machine learning algorithm to train a deep semantic similarity neural network to output a semantic similarity score between a candidate job search query and a candidate job search result. At operation 812, it is determined if there are any additional sample job posting search queries. If so, then the method 800 loops to operation 810 for the next sample job posting search query. If not, then the method 800 moves to the retrieval phase 804.

Here, at operation 814, a job search query is received from a member of the social networking service. At operation 816, the job search query is augmented using the deep semantic similarity neural network. Specifically, the semantic similarity of terms in the job search query as compared to other terms in the semantic vector space is determined and those semantically similar terms can be added to the job search query. At operation 818, the job search query is submitted to a job posting database 308 to obtain a plurality of job posting search results.

In the ranking phase 806, at operation 820 a first pass ranking operation is performed. This first pass ranking operation may or may not utilize the deep semantic similarity neural network as part of its ranking algorithm. While not pictured, this first pass ranking operation may involve looping through each of the plurality of job posting search results and calculating a score for each of the job posting search results according to some ranking algorithm. The plurality of job posting results may then be sorted according to their scores. At operation 822, a second pass ranking operation is performed on the sorted job posting search results.

Figure 9:
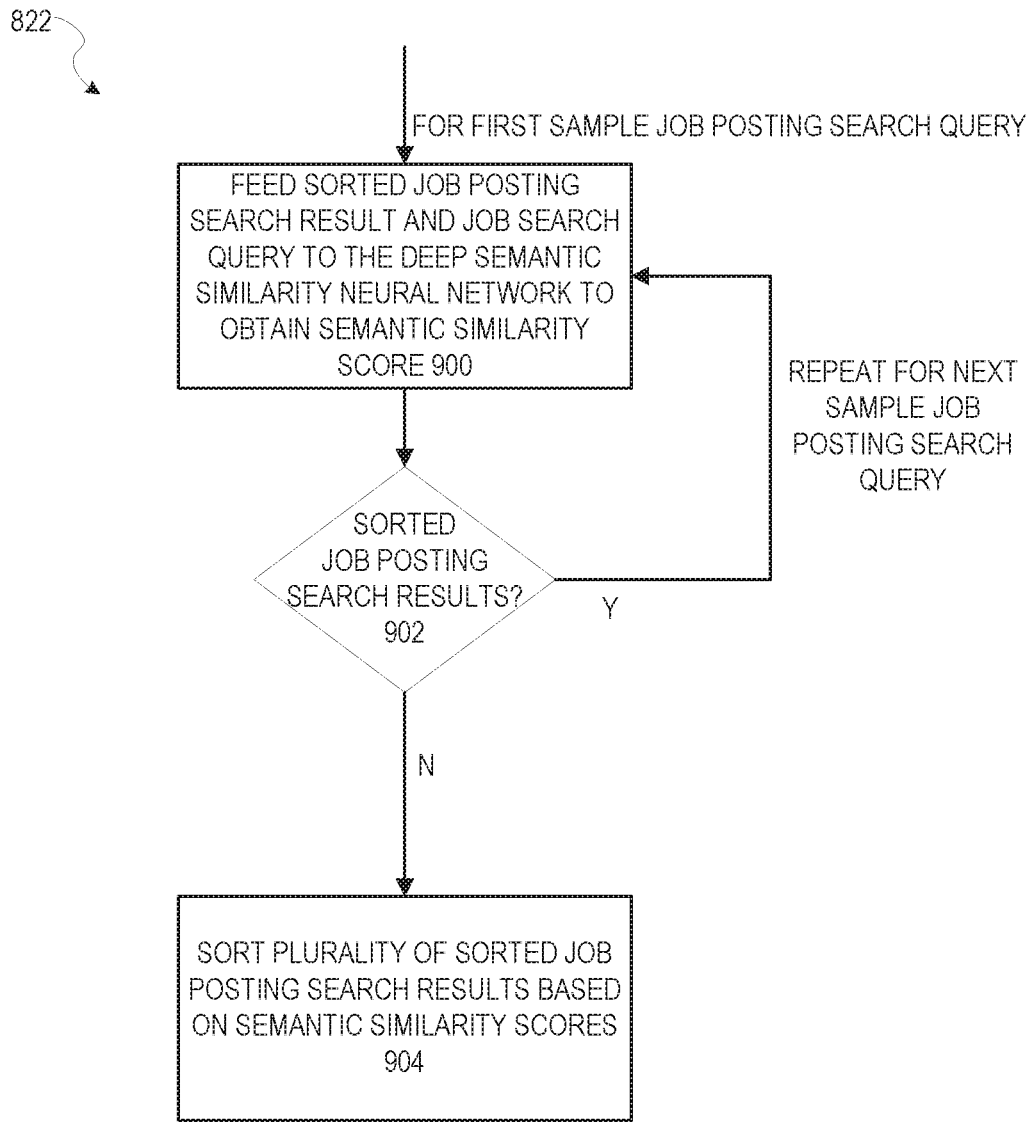
FIG. 9 is a flow diagram illustrating a method for performing a second pass ranking operation, in accordance with an example embodiment.

FIG. 9 is a flow diagram illustrating a method 822 for performing a second pass ranking operation, in accordance with an example embodiment. Here, a loop may be begun for each of the plurality of sorted job posting search results. At operation 900, the sorted job posting search result and the job search query are fed to the deep semantic similarity neural network to obtain a semantic similarity score between the job posting search result and the job search query.

At operation 902, it is determined if there are any additional sorted job posting search results in the plurality of sorted job posting search results. If so, then the method 822 loops to operation 900 for the next sorted job posting search result in the plurality of sorted job posting search results.

If not, then at operation 904, the plurality of sorted job posting search results are sorted based on the semantic similarity score for each of the job posting search results.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications 120, and so forth described in conjunction with FIGS. 1-9 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 10:
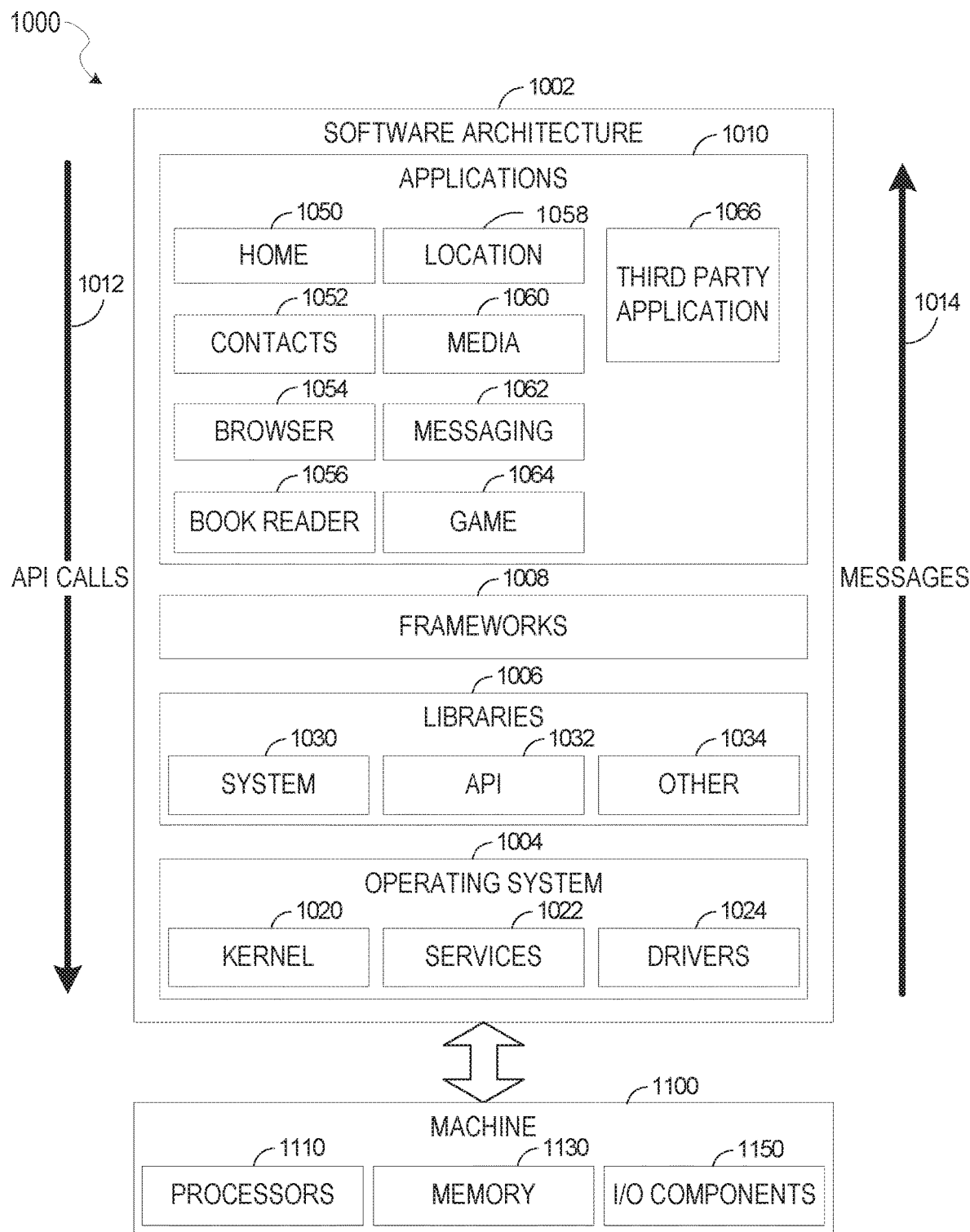
FIG. 10 is a block diagram illustrating a representative software architecture, which may be used in conjunction with various hardware architectures herein described.

FIG. 10 is a block diagram 1000 illustrating a representative software architecture 1002, which may be used in conjunction with various hardware architectures herein described. FIG. 10 is merely a non-limiting example of a software architecture, and it will be appreciated that many other architectures may be implemented to facilitate the functionality described herein. The software architecture 1002 may be executing on hardware such as a machine 1100 of FIG. 11 that includes, among other things, processors 1110, memory/storage 1130, and I/O components 1150. A representative hardware layer 1100 is illustrated and can represent, for example, the machine 1100 of FIG. 11. The representative hardware layer 1100 comprises one or more processing units 1110. The executable instructions 1008 represent the executable instructions of the software architecture 1002, including implementation of the methods, modules, and so forth of FIGS. 1-9. The hardware layer 1100 also includes memory and/or storage modules 1130, which also have the executable instructions 1008.

In the example architecture of FIG. 10, the software architecture 1002 may be conceptualized as a stack of layers where each layer provides particular functionality. For example, the software architecture 1002 may include layers such as an operating system 1004, libraries 1006, frameworks/middleware 1008, and applications 1010. Operationally, the applications 1010 and/or other components within the layers may invoke API calls 1012 through the software stack and receive responses, returned values, and so forth, illustrated as messages 1014, in response to the API calls 1012. The layers illustrated are representative in nature and not all software architectures have all layers. For example, some mobile or special-purpose operating systems may not provide a layer of frameworks/middleware 1008, while others may provide such a layer. Other software architectures may include additional or different layers.

The operating system 1004 may manage hardware resources and provide common services. The operating system 1004 may include, for example, a kernel 1020, services 1022, and drivers 1024. The kernel 1020 may act as an abstraction layer between the hardware and the other software layers. For example, the kernel 1020 may be responsible for memory management, processor management (e.g., scheduling), component management, networking, security settings, and so on. The services 1022 may provide other common services for the other software layers. The drivers 1024 may be responsible for controlling or interfacing with the underlying hardware. For instance, the drivers 1024 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1006 may provide a common infrastructure that may be utilized by the applications 1010 and/or other components and/or layers. The libraries 1006 typically provide functionality that allows other software modules to perform tasks in an easier fashion than by interfacing directly with the underlying operating system 1004 functionality (e.g., kernel 1020, services 1022, and/or drivers 1024). The libraries 1006 may include system libraries 1030 (e.g., C standard library) that may provide functions such as memory allocation functions, string manipulation functions, mathematical functions, and the like. In addition, the libraries 1006 may include API libraries 1032 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1006 may also include a wide variety of other libraries 1034 to provide many other APIs to the applications 1010 and other software components/modules.

The frameworks 1008 (also sometimes referred to as middleware) may provide a higher-level common infrastructure that may be utilized by the applications 1010 and/or other software components/modules. For example, the frameworks 1008 may provide various graphic user interface (GUI) functions, high-level resource management, high-level location services, and so forth. The frameworks 1008 may provide a broad spectrum of other APIs that may be utilized by the applications 1010 and/or other software components/modules, some of which may be specific to a particular operating system 1004 or platform.

The applications 1010 include third-party applications 1066. Examples of representative built-in applications 1066 may include, but are not limited to, a contacts application, a browser application, a book reader application, a location application, a media application, a messaging application, and/or a game application. The third-party applications 1066 may include any of the built-in applications 1040 as well as a broad assortment of other applications. In a specific example, the third-party application 1066 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1066 may invoke the API calls 1021 provided by the mobile operating system such as the operating system 1004 to facilitate functionality described herein.

The applications 1010 may utilize built-in operating system 1004 functions (e.g., kernel 1020, services 1022, and/or drivers 1024), libraries 1006 (e.g., system libraries 1030, API libraries 1032, and other libraries 1034), and frameworks/middleware 1008 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Example Machine Architecture and Machine-Readable Medium

Figure 11:
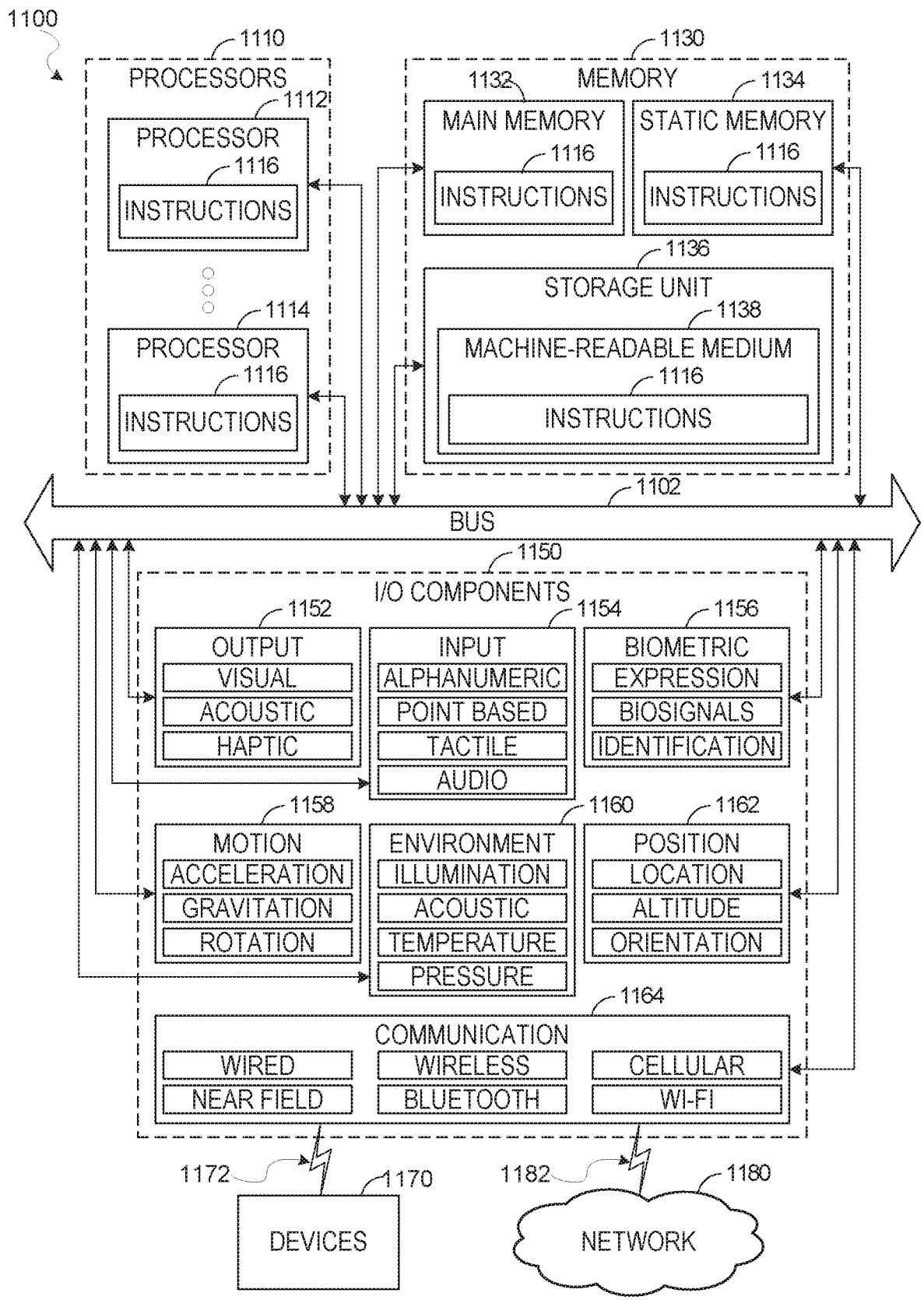
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. The instructions 1116 transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute the instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiples cores, or any combination thereof.

The memory/storage 1130 may include a memory 1132, such as a main memory, or other memory storage, such as static memory 1134, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media 1138.

As used herein, "machine-readable medium" means a device able to store instructions 1116 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or other suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF47, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols Hypertext Transfer Protocol (HTTP)). Similarly, the instructions 1116 may be transmitted or received using a transmission medium via the coupling 1172 (e.g., a peer-to-peer coupling) to the devices 1170, The term "transmission medium" shall be taken to include any intangible medium that is capable of storing, encoding, or carrying the instructions 1116 for execution by the machine 1100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a non-transitory computer-readable medium having instructions stored thereon, which, when executed by a processor, cause the system to:
obtain training data pertaining to sample job posting search queries, the training data comprising sample job posting search results and indications as to which of the sample job posting search results were selected by members performing job posting search queries corresponding to the sample job posting search results;
for each of the sample job posting search queries, feed the training data corresponding to the sample job posting into a machine learning algorithm to train a deep semantic similarity neural network to output a semantic similarity score indicating semantic similarity between a candidate job search query and a candidate job search result;
identify a plurality of job search results in response to a first job search query;
for each of the plurality of job search results:
feed the job search result and the first job search query into the deep semantic similarity neural network to obtain a semantic similarity score indicating semantic similarity between the job search result and the first job search query;
rank the plurality of job search results based on the semantic similarity score for each of the job search results;
transmit the ranked plurality of job search results to a client device for display; and
augment the first job search query using terms that are semantically similar to terms in the first job search query, utilizing a semantic similarity score output from the deep semantic similarity neural network.

2. The system of claim 1, wherein the deep semantic similarity neural network includes a hashing layer, an embedding layer, a plurality of non-linear activation layers, and a cosine similarity layer.

3. The system of claim 2, wherein the plurality of non-linear activation layers have an activation unit of tan h, wherein tan h is a hyperbolic tangent function.

4. The system of claim 2, wherein the hashing layer converts incoming text into multiple n-letter tokens.

5. The system of claim 3, wherein the embedding layer represents the multiple n-letter tokens in a vector space.

6. The system of claim 1, wherein the deep semantic similarity neural network is a Siamese network.

7. A computerized method, comprising:
obtaining training data pertaining to sample job posting search queries, the training data comprising sample job posting search results and indications as to which of the sample job posting search results were selected by members performing job posting search queries corresponding to the sample job posting search results;
for each of the sample job posting search queries, feeding the training data corresponding to the sample job posting into a machine learning algorithm to train a deep semantic similarity neural network to output a semantic similarity score indicating semantic similarity between a candidate job search query and a candidate job search result, wherein the deep semantic similarity neural network is a Siamese network;
identifying a plurality of job search results in response to a first job search query;
for each of the plurality of job search results:
feeding the job search result and the first job search query into the deep semantic similarity neural network to obtain a semantic similarity score indicating semantic similarity between the job search result and the first job search query;
ranking the plurality of job search results based on the semantic similarity score for each of the job search results;
transmitting the ranked plurality of job search results to a client device for display.

8. The method of claim 7, wherein the deep semantic similarity neural network includes a hashing layer, an embedding layer, a plurality of non-linear activation layers, and a cosine similarity layer.

9. The method of claim 8, wherein the plurality of non-linear activation layers have an activation unit of tan h, wherein tan h is a hyperbolic tangent function.

10. The method of claim 8, wherein the hashing layer converts incoming text into multiple n-letter tokens.

11. The method of claim 8, wherein the embedding layer represents the multiple n-letter tokens in a vector space.

12. The method of claim 7, further comprising: augmenting the first job search query using terms that are semantically similar to terms in the first job search query, utilizing a semantic similarity score output from the deep semantic similarity neural network.

13. A non-transitory machine-readable storage medium comprising instructions, which when implemented by one or more machines, cause the one or more machines to perform operations comprising:

obtaining training data pertaining to sample job posting search queries, the training data comprising sample job posting search results and indications as to which of the sample job posting search results were selected by members performing job posting search queries corresponding to the sample job posting search results;

for each of the sample job posting search queries, feeding the training data corresponding to the sample job posting into a machine learning algorithm to train a deep semantic similarity neural network to output a semantic similarity score indicating semantic similarity between a candidate job search query and a candidate job search result, identifying a plurality of job search results in response to a first job search query;

for each of the plurality of job search results:

feeding the job search result and the first job search query into the deep semantic similarity neural network to obtain a semantic similarity score indicating semantic similarity between the job search result and the first job search query;

ranking the plurality of job search results based on the semantic similarity score for each of the job search results;

transmitting the ranked plurality of job search results to a client device for display; and augment the first job search query using terms that are semantically similar to terms in the first job search query, utilizing a semantic similarity score output from the deep semantic similarity neural network.

14. The non-transitory machine-readable storage medium of claim 13, wherein the deep semantic similarity neural network includes a hashing layer, an embedding layer, a plurality of non-linear activation layers, and a cosine similarity layer.

15. The non-transitory machine-readable storage medium of claim 14, wherein the plurality of non-linear activation layers have an activation unit of tan h, wherein tan h is a hyperbolic tangent function.

16. The non-transitory machine-readable storage medium of claim 14, wherein the hashing layer converts incoming text into multiple n-letter tokens.

17. The non-transitory machine-readable storage medium of claim 14, wherein the embedding layer represents the multiple n-letter tokens in a vector space.

* * * * *

UNITED STATES PATENT AND TRADEMARK OFFICE
CERTIFICATE OF CORRECTION

PATENT NO. : 10,832,131 B2
APPLICATION NO. : 15/658704
DATED : November 10, 2020
INVENTOR(S) : Kataria et al.

It is certified that error appears in the above-identified patent and that said Letters Patent is hereby corrected as shown below:

In the Claims

In Column 18, Line 21, in Claim 3, delete "tan h," and insert --tanh,-- therefor In Column 18, Line 22, in Claim 3, delete "tan h" and insert --tanh-- therefor In Column 18, Line 62, in Claim 9, delete "tan h," and insert --tanh,-- therefor In Column 18, Line 63, in Claim 9, delete "tan h" and insert --tanh-- therefor In Column 20, Line 20, in Claim 15, delete "tan h," and insert --tanh,-- therefor In Column 20, Line 20, in Claim 15, delete "tan h" and insert --tanh-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*